United States Patent [19]

Randolph et al.

[11] 4,345,801
[45] Aug. 24, 1982

[54] TURBINE METER ROTOR BEARING

[75] Inventors: Jeptha F. Randolph, Tulsa; Donald L. Stout, Sand Springs, both of Okla.

[73] Assignee: Combustion Engineering, Inc., Windsor, Conn.

[21] Appl. No.: 122,091

[22] Filed: Feb. 19, 1980

[51] Int. Cl.³ .................. F16C 33/20; G01F 1/10
[52] U.S. Cl. .................... 308/238; 308/DIG. 7; 73/861.92
[58] Field of Search ............... 308/36, 238, DIG. 7, 308/DIG. 8; 73/861.92

[56] References Cited

U.S. PATENT DOCUMENTS

| | | | |
|---|---|---|---|
| 3,240,095 | 3/1966 | Steinway | 308/238 |
| 3,464,845 | 9/1969 | Osborn et al. | 308/238 |
| 3,546,940 | 12/1970 | Short | 73/861.92 |
| 3,798,968 | 3/1974 | Harris | 73/861.92 |
| 3,948,099 | 4/1976 | Geisow | 73/861.92 |
| 4,000,932 | 1/1977 | Harris et al. | 308/237 R |
| 4,132,453 | 1/1979 | Burrus et al. | 308/238 |
| 4,219,916 | 9/1980 | Kincel | 308/238 |

*Primary Examiner*—Richard R. Stearns
*Attorney, Agent, or Firm*—Arthur L. Wade

[57] ABSTRACT

The rotor of a turbine meter has a high performance polymer bushing and is mounted on a stainless steel shaft. The polymer bushing through the rotor has a flange formed on each end to capture the body of the rotor. The stainless steel shaft on which the rotor is journaled is bonded into a cavity of a spider with a slip-fit, the flanges on the bushing bearing alternatively on the spiders, depending upon the direction of metered flow.

3 Claims, 1 Drawing Figure

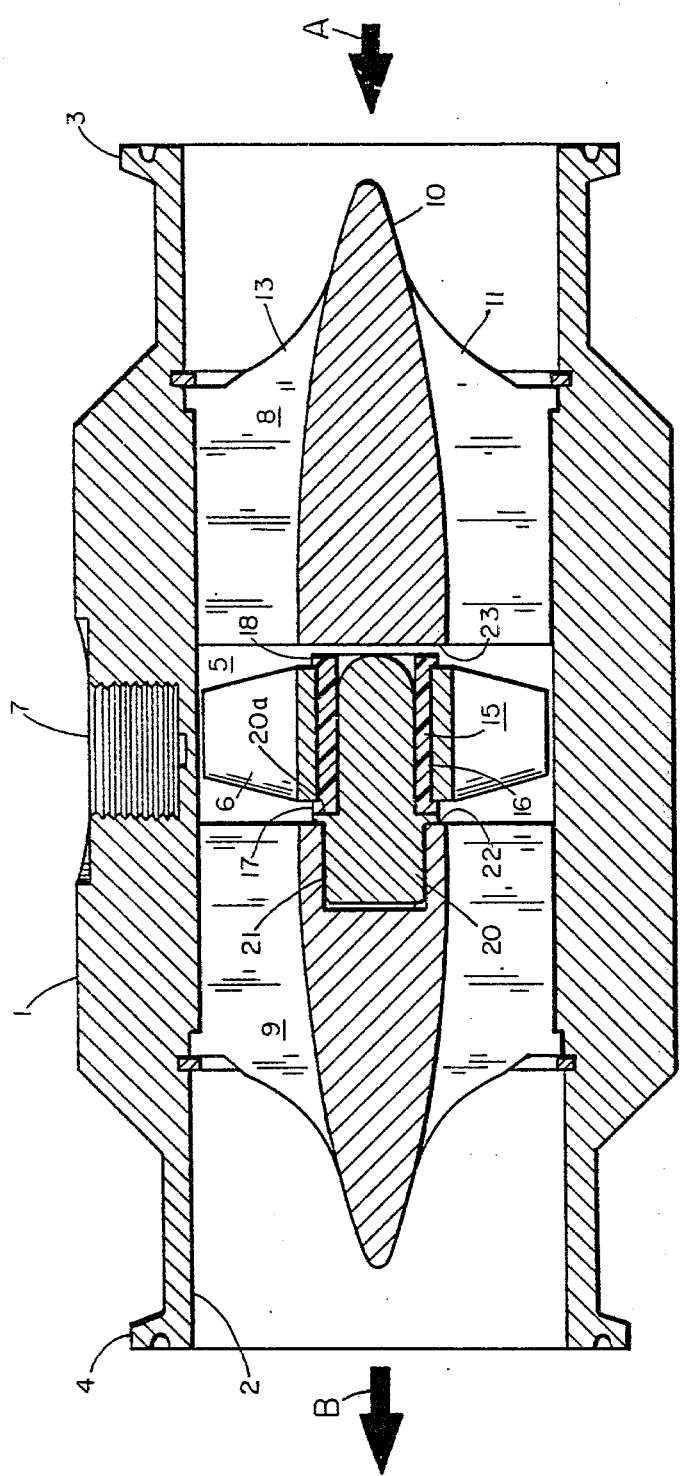

TURBINE METER ROTOR BEARING

TECHNICAL FIELD

The present invention relates to bearings for the rotors of turbine meters. More specifically, this invention relates to a bearing which includes a bushing formed of a polymer extending axially through the rotor and flanged on each end to capture the body of the rotor. Even more specifically, the invention relates to the material of the bushing and shaft and the manner of mounting the shaft on its spider.

BACKGROUND ART

There has always been, and will always be, pressure for improvements to the bearings of turbine meter rotors. One, there is the overhanging need for a bearing which will provide for flow reversals. Lubrication will never be completely satisfactory. Now the sanitary market requires more simplicity to reduce retention of food in which harmful bacteria will develop. All configurations of turbine meter structure are being redesigned to get the simple form which will not harbor collections of food-fluids metered or which can be readily flushed clean of this residue.

The food industry is active in establishing standards for meter structures which must be brought into direct contact with food. No turbine meter design has been given a universal stamp of approval. This art has the problem of providing the meter function with structure which is simple enough to meet the evolving sanitary standards of industry as they apply to measurement.

DISCLOSURE OF INVENTION

The present invention contemplates a bushing for the bearing of a turbine meter supported between two spider structures in the bore of a housing, the bushing structure formed of a polymer in the configuration of a sleeve portion extending axially through the rotor bore with flanges mounted on each end of the sleeve capturing the body of the rotor. The rotor bushing is journaled over a cantilevered shaft of stainless steel bonded within the axial cavity of the downstream of the two spiders. The downstream bushing flange bears upon a shoulder of the stainless steel shaft in normal operation of the meter, while the upstream bushing flange is arranged to engage the face of the second spider structure, in bearing relationship, when flow is reversed through the meter.

Other objects, advantages and features of this invention will become apparent to one skilled in the art upon consideration of the written specification, appended claims, and attached drawings.

BRIEF DESCRIPTION OF DRAWING

The drawing is a sectioned elevation of a turbine meter body with a rotor bearing including the present invention.

BEST MODE FOR CARRYING OUT THE INVENTION

Referring to the drawing, there is disclosed a flanged body of a turbine meter. Body 1 has a central bore 2 through which fluids to be metered are flowed. Arrow A indicates the direction of fluid flow into the bore 2, and arrow B indicates the flow out of the bore. Flanges 3,4 represent one means with which the body 1 can be included in a conduit and respond to the fluid as it flows therethrough.

The primary element of the meter which responds to the fluid flow is rotor 5. It is basically the object of the invention to support rotor 5 on a bearing within bore 2 so it will rotate by contact with the fluid flowing through the bore. The rotor vanes 6, extending radially from the rotor, cut magnetic lines of force sustained by a pickup element mounted in receptacle 7. The rate at which the lines of force are cut becomes a measure of the fluid flow rate through bore 2.

Rotor 5 is a shell-like housing to which rotor vanes 6 are attached on its external surface. The specific bearing and shaft support for rotor-housing 5 embodies the concepts of the present invention.

Spiders 8 and 9 each comprise a central elongated body and legs radiating outward to engage the walls of bore 2. Refer to upstream spider 8. Body 10 may be cast with legs 11, 12 (not shown), 13 as an extended part of the body. There could be more, but usually three legs are adequate for the required stability of rotor 5.

It is evident that all three legs 11, 12, 13 of spider 8 extend to the wall of bore 2. Legs of the spiders are anchored to the wall by structures which are disclosed but which need not be described in detail.

The stark simplicity of the grooves and extended legs militate against the dreaded collection of food material in which bacteria develops to contaminate. Also, the same simplicity of structure for the rotor bearing keeps it clean or readily flushed of food passing through bore 2. Compared with the complexity of prior art bearing structures, the present bearing structure disclosed is readily cleaned and provides a minimum number of cavities for catching and retaining food particles. The arrangement gives a stable, rugged, dependable bearing for rotor 5. At the same time, the structure meets the developing standards for a "sanitary" turbine meter. At this point in time, there are few known, commercially available, turbine meter structures which are accepted by the food industry for the service of metering food fluids. A significant breakthrough has been made in this particular art.

Having cleared the preliminaries and given the proper setting, the present invention can now be hopefully disclosed with simplicity and clarity. The structure embodying the invention is in the bearing for rotor 5.

As stated, and indicated supra, there are many forms of bearing supports in the prior art. Some bear superficial comparison to the embodiment of this invention. However, there are marked differences which amount to a significant advance in the art.

Among the unsatisfactory characteristics of materials for prior art bearings are those which enable the bearing structure to shatter when subjected to sudden stress. Also, lack of lubrication from the fluids passing over the material has caused failures of these materials. Up to the present invention, there has not been discovered or developed a combination of materials and structure which provide the degree of simplicity, dependability, self-lubrication and self-cleaning required by the food industry.

The present invention sweeps aside the prior art embodiments of bearing structures and methods for forming these structures. The present invention contemplates an axial bushing 15 for a rotor comprising a sleeve portion 16 and flanges 17 and 18.

The material selected for this bushing 15 must have the strength, stiffness, and wear-resistance to meet the service of rotation on a stainless steel shaft. At the same time, the bushing material can be readily machined and formed into position within the central bore of rotor housing 5. Further, the bushing material must have self-lubricating qualities when bearing upon the stainless steel shaft and the faces of the stainless steel spider supports for the rotor. The invention embodied in the bushing 15 is implemented when the bushing is combined with the rotor housing 5 which is formed as a simple right angle cylinder. Vanes 6 radiate from the external surface of this housing cylinder to provide the rotational force developed by a fluid flowing into engagement with the vanes.

The combination of the housing 5 and the bushing is brought about by a capture of the housing 5 by the flanges 17 and 18. This combination of rotor and bushing is then journaled over a stainless steel shaft.

Stainless steel shaft 20 is mounted in downstream spider 9. More specifically, a cavity 21 is formed axially within the face 22 of the spider body 9. Shaft 20 is received within this cavity 21 with a slip fit or a clearance of 0.005 to 0.010 on each side and bonded permanently into place. The shaft 20, from its shoulder 20a extends toward the face 23 of upstream spider 8 and terminates with a definite clearance. With the bushing-rotor combination mounted on the shaft 20, a bearing surface is provided for normal flow, as indicated in the drawing, between the shoulder 20a and flange 17. When flow is reversed through the meter, flange 18 will be brought against spider face 23. Again, more specifically, the downstream bushing flange 17 bears upon the shoulder 20a of the stainless steel shaft in normal operation of the meter, while the upstream bushing flange 18 is arranged to engage the face of the second spider structure, in bearing relationship, when flow is reversed through the meter. Thus, the bearing surfaces will engage, dependent upon the direction of fluid flow through the housing bore of the meter.

Materials

The material for the spider supports 8 and 9 and shaft 10 have been disclosed as stainless steel. It is recognized that there are various stainless steels and possibly several of them are satisfactory for the spider supports and shafts of this embodiment. It is felt unnecessary to stipulate in this material anything other than stainless steels. Certainly, all of the stainless steels available would give the required toughness, strength, dimensional stability and wear resistance required in this service.

The material for bushing 15 is a slightly different matter. First, this material must have a degree of self-lubricating ability, along with dimensional stability at temperatures up to 400° F. When the turbine meter is cleaned by steam or other non-lubricating fluids, the material of the bushing contacted by the stainless steel shaft and spider support faces must not gall, bind or seize. Polytetrafluoroethylene provides satisfactory self-lubricating characteristics. This material, widely known as manufactured under the trademark "Teflon", a registered trademark of Dupont, is employed in many similar applications. Certainly, it ranks high as a choice for this present embodiment.

Unfortunately, the Teflon material does not have the necessary strength for the present service. However, there are polymers which can be combined with the Teflon material to result in a combination which will adequately serve.

Ryton is a registered trademark of Phillips Petroleum Company for polyphenylene sulfide material. When this polymer is extruded with Teflon material, as the dominant phase, it will impart all of the satisfactory characteristics required.

Process

Given the filled Teflon material, a cylinder is formed, sized with an outside diameter which will enable it to be fitted into the bore of housing 5. Flanges are formed on each end of the polymer cylinder to capture the rotor on the outside surface of the cylinder. The polymer can be satisfactorily formed at a temperature of 400° F. with a reasonable pressure. A bore is then formed along the axis of the bushing cylinder, the diameter of this bore enabling it to be journaled over the cantilevered stainless steel shaft of the bearing.

The stainless steel shaft is bonded into its spider cavity. A bonding material satisfactory for this service is Loctite retaining compound RC/620, manufactured by the Loctite Corporation. The result is a shaft supported from its spider as a true cantilever.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. In a turbine meter having a bored housing and two alligned spider supports within the housing bore, a bearing for a rotor mounted between the two spider supports, including,
    a rotor housing with an axial bore and adapted to be mounted between the spider support structures,
    a bushing predominantly of polytetrafluoroethylene mounted axially in the rotor bore and terminating in flanges which capture the bushing within the rotor bore,
    and a shaft of stainless steel mounted in the downstream of the two spider supports and having a shoulder facing upstream as the shaft extends axially of the bore of the turbine meter body and through the rotor bushing to a predetermined clearance from the face of the upstream spider support,
    whereby the shaft shoulder forms the normal bearing surface for the downstream flange of the bushing and the upstream spider support face forms a bearing surface for the upstream bushing flange when flow is reversed through the meter.
2. The bearing of claim 1, in which,
    the bushing of predominantly polytetrafluoroethylene is filled with polyphenylene sulfide so that the combination is both self-lubricating and has the strength to function in the bearing.
3. The bearing of claim 1, wherein,
    the stainless steel shaft is bonded within an opening in the face of its spider support with a clearance in the order of 0.005 to 0.010 inches on a side.

* * * * *